UNITED STATES PATENT OFFICE.

BURRITT S. LACY, OF SEWAREN, NEW JERSEY, ASSIGNOR, BY MESNE ASSIGNMENTS, TO THE ROESSLER & HASSLACHER CHEMICAL COMPANY, A CORPORATION OF NEW YORK.

PROCESS FOR MANUFACTURING ALCOHOLS.

1,253,055.      Specification of Letters Patent.      Patented Jan. 8, 1918.

No Drawing.      Application filed October 4, 1913. Serial No. 793,408.

*To all whom it may concern:*

Be it known that I, BURRITT S. LACY, a citizen of the United States of America, and a resident of Sewaren, in the county of Middlesex and State of New Jersey, have invented certain new and useful Improvements in Processes for Manufacturing Alcohols, of which the following is a specification.

It is well-known that alcohols of the paraffin series may be prepared by treating the monohalogen compound of the corresponding hydrocarbon with silver hydroxid or moist silver oxid. For this purpose the bromid or iodid is usually employed, as they are frequently more convenient to handle and react in general much more rapidly than the chlorin compound; for instance,—

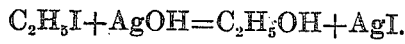

$$C_2H_5I + AgOH = C_2H_5OH + AgI.$$

In addition to the above general method, it was shown many years ago by Berthelot (*Comptes Rendus*, vol. 45, p. 916, (1857); also *Ann. Chim. Phys.* (3) vol. 52, p. 101, (1858), in describing a method of theoretical interest by which methyl alcohol could be made starting from the elements, that by heating together for one week methyl chlorid gas and a solution of caustic potash in a sealed glass tube at a temperature of 100° C. methyl alcohol was produced from the methyl chlorid:—

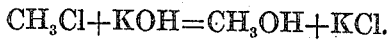

$$CH_3Cl + KOH = CH_3OH + KCl.$$

It is also known that by merely heating the alkyl halids with water, some of the corresponding alcohol is produced, but the reaction goes slowly; and, unless a very large excess of water is used, only partially, being limited by the tendency of the reverse reaction to occur.

Thus Niederist (Liebig's *Annalen*, vol. 186, p. 388, (1877); *Ibid.* 196, 349 (1879) found that on heating $CH_3I$ with about 15 times its weight of water at 100° C., it required eight hours before $CH_3I$ was no longer visible in the solution, and that the amounts of HI and $CH_3OH$ (as $1\frac{1}{2}\%$ solution) then present were equivalent to 85% of the original amount of $CH_3I$; and that $CH_3Br$ and $C_2H_5I$ gave similar results. He made no tests with $CH_3Cl$ and $C_2H_5Cl$.

It is thus evident that the preparation of alcohols, for example methyl alcohol from the corresponding chlorid, has hitherto not been commercially practicable because the reaction in the case of methyl chlorid with caustic potash, if judged by Berthelot's published results, is exceedingly slow, while the reactions of the alkyl halogens with water alone would seem to be not only slow, but also to require the presence of a great excess of water in order to be complete.

I have discovered that the alkyl halogens can be made to react with a substance of a chemically basic nature such as the hydroxids or carbonates of the alkalis or the alkaline earths or with mixtures thereof, in such a manner that the reaction goes not only completely but very rapidly, provided certain physical conditions specifically pointed out below are observed.

As the substance of chemically basic nature I prefer to use ordinary slaked lime on account of its cheapness. I have discovered that under the conditions referred to above this substance notwithstanding its slight solubility reacts with sufficient rapidity to allow its commercial use.

I shall describe my invention in connection with the manufacture of methyl alcohol from the corresponding chlorid although this is to be taken as merely illustrative of one way of practising the principles of the invention as the necessary conditions are the same in connection with the manufacture of other alcohols.

For example if lime be used as the basic substance the conditions for its rapid reaction with methyl chlorid are as follows:

(1) That the methyl chlorid gas, the solution and the solid lime be vigorously and continuously agitated together, for instance by means of a rapidly rotating stirring arrangement, or by bubbling the gas through the hot milk of lime, by atomizing the liquid through the gas, or by other suitable means of bringing the reacting constituents into intimate contact.

The probable explanation of the necessity of this is that the reaction occurs only in solution, *i. e.*, between the dissolved $CH_3Cl$ gas and the dissolved $Ca(OH)_2$, consequently in order to get the maximum reaction velocity the solution must be kept saturated with the $CH_3Cl$ and $Ca(OH)_2$.

(2) That the methyl chlorid be forced into the reaction vessel at such a rate that the total pressure as registered by the gage of the reaction vessel shall be maintained at a point which is considerably above the vapor pressure of the liquid alone in the absence of methyl chlorid. The difference between the total pressure as registered by the gage of the reaction vessel during reaction, and that observed when there is no methyl chlorid present, I designate as the effective pressure of the methyl chlorid.

I have found that the rapidity of the reaction, other things being equal, is in direct proportion to the effective pressure of the methyl chlorid.

(3) The temperature should be considerably above 100° C., as the velocity—other things being equal—increases rapidly with the temperature.

It should be noted that the practical limitation on the reaction velocity attainable is imposed by the total pressure which the reaction vessel can safely withstand. For such a given pressure there is a certain temperature at which the reaction velocity is a maximum; for example in the case of methyl chlorid and milk of lime if the total allowable pressure is 300 pounds I have found that the optimum reaction temperature is in the neighborhood of 190° C. If we work above this temperature, the favorable influence of the higher temperature is more than offset by the decrease in the effective pressure which results from the increase in vapor tension of the liquid itself; while below this temperature the loss of reaction velocity, due to the decrease in temperature, more than offsets the gain due to the increased effective pressure of the methyl chlorid.

To give a specific instance:— The reaction vessel consisted of a 6" diameter iron pipe about 20 inches long, volume about nine liters, closed at both ends, placed in a horizontal position and about one-half full of milk of lime, containing 15% by weight of $Ca(OH)_2$. The temperature of the milk of lime was about 190° C., and vigorous stirring was provided by a rapidly rotating shaft which carried a number of paddles to churn together gas, liquid and solid.

Into this reaction vessel, the gage of which recorded the vapor pressure of water at 190°, namely 167 lbs., was now passed methyl chlorid gas until the gage stood at 263 lbs., the total pressure being maintained at this point by regulating the inlet valve. The effective pressure of methyl chlorid in this case was thus 263—167=96 lbs., or about 6½ atmospheres.

After operating for 15 minutes, then shutting off the supply of $CH_3Cl$, the $CH_3Cl$ which had been passed in was found to be practically completely transformed into methyl alcohol, there being found present in the solution, besides some unused $Ca(OH)_2$, about 7% by weight of $CH_3OH$ and the equivalent amount (about 12%) of $CaCl_2$. The $CH_3OH$ was then easily distilled from the aqueous solution of $CaCl_2$ and $Ca(OH)_2$.

I have also found that $CaCO_3$ can be used instead of $Ca(OH)_2$, provided that the $CO_2$ which is produced is blown out from time to time in order to allow fresh $CH_3Cl$ gas to enter the reaction vessel. Moreover, I have found that by replacing the $Ca(OH)_2$ either by NaOH or by a mixture of $Ca(OH)_2$ and $Na_2CO_3$, the formation of $CH_3OH$ may be attained with a rapidity more than twenty times as great as by the use of $Ca(OH)_2$ alone in the instance described; or a much lower temperature may be used and yet permit the attainment of a rapidity as great as when $Ca(OH)_2$ is employed at 190°. The sodium hydroxid solution may, if desired, be prepared by the well-known method of causticizing sodium carbonate solution with milk of lime, as the presence of some sodium carbonate in the sodium hydroxid solution thus obtained does no harm, provided the sodium hydroxid is not allowed to be completely used up by the methyl chlorid.

It is further to be observed that so long as $Ca(OH)_2$ or NaOH is present in solution, the iron of the reaction vessel remains entirely unattacked; but if the hydroxid is allowed to be completely used up, the iron is immediately attacked, considerable amounts being found in solution. It is obvious that the vigorous stirring of the alkaline solution in the reaction space by means of a mixing device such as that described, results in continuously coating the walls and all other exposed metallic surfaces within the reaction vessel with a thin layer of the alkaline solution, thus forming a film of alkaline solution on said walls or surfaces and that so long as said solution remains alkaline the metallic surfaces in contact with the gases contained in the reaction chamber will not be attacked.

The process may be operated continuously, hot milk of lime and $CH_3Cl$ gas entering at one end, and a solution of water, methyl alcohol and calcium chlorid (together with the excess of lime) leaving at the other. Moreover, a large part of the methyl alcohol may, if desired, be obtained in the form of a strong aqueous solution by blowing off the mixture of steam and alcohol vapor from the outlet of the apparatus; or the whole of the alcohol may be run out in the form of solution (containing also $CaCl_2$) from the autoclave, and after partial cooling passed directly into a distilling apparatus.

It is obvious that the principles of the invention may be applied in connection with the manufacture of other alcohols than methyl alcohol and I do not restrict myself to any of the details shown and described by way of example, further than the scope of the appended claims demands, either with reference to the particular halid or the particular basic substance or the particular steps employed.

What I claim and desire to secure by Letters Patent is:

1. A process of manufacturing alcohols consisting in causing an alkyl halid to react in a closed chamber with a substance of a chemically basic nature in the presence of a liquid while maintaining the whole in intimate mixture and at an elevated temperature and high effective pressure of the alkyl halid.

2. A process of manufacturing methyl alcohol consisting in causing methyl chlorid to react in a closed chamber with a substance of a chemically basic nature in the presence of a liquid while maintaining the whole in intimate mixture and at an elevated temperature and elevated effective pressure of methyl-chlorid.

3. A process of manufacturing methyl alcohol consisting in causing methyl chlorid gas at an effective pressure of greater than one atmosphere to react in a closed chamber with a substance of a chemically basic nature in the presence of water and constantly offering new surfaces of the basic solution to the methyl chlorid, while maintaining the whole at a temperature substantially above 100° C.

4. A process of manufacturing methyl alcohol consisting in causing methyl chlorid gas to react in a closed chamber with calcium hydroxid in the presence of a liquid while maintaining the whole in intimate mixture and at an elevated temperature.

5. A process of manufacturing methyl alcohol consisting in causing methyl chlorid gas to react in a closed chamber with calcium hydroxid in the presence of water while maintaining the whole in intimate mixture and at an elevated temperature.

6. A process of manufacturing methyl alcohol consisting in causing methyl chlorid gas to react in a closed chamber with calcium hydroxid in the presence of water while maintaining the whole in intimate mixture and at a temperature above 100° C.

7. A process of manufacturing methyl alcohol consisting in causing methyl chlorid gas at an effective pressure of greater than one atmosphere to react in a closed chamber with calcium hydroxid in the presence of water while maintaining the whole in intimate mixture and at a temperaure above 100° C.

8. A process of manufacturing alcohols consisting in causing an alkyl halid to react with calcium hydroxid in the presence of a liquid while maintaining the whole in intimate mixture and at an elevated temperature.

9. A process of manufacturing alcohols consisting in causing an alkyl halid to react with calcium hydroxid in the presence of water while maintaining the whole in intimate mixture and at an elevated temperature.

10. A process of manufacturing alcohols consisting in causing an alkyl halid to react with calcium hydroxid in the presence of water while maintaining the whole in intimate mixture and at a temperature above 100° C.

11. A process of manufacturing alcohols consisting in causing an alkyl halid to react with a mixture of calcium hydroxid and sodium carbonate in the presence of a liquid while maintaining the whole in intimate mixture and at an elevated temperature.

12. A process of manufacturing alcohols consisting in causing an alkyl halid to react with a mixture of calcium hydroxid and sodium carbonate in the presence of water while maintaining the whole in intimate mixture and at an elevated temperature.

13. A process for the saponification of chlor derivatives of aliphatic hydrocarbons in a closed vessel, said process consisting in charging the vessel with an alkaline solution and a chlor derivative of an aliphatic hydrocarbon; coating the interior of the vessel with a film of the liquids therein by agitating the contents of the vessel, and raising the temperature to above 100° C. and the pressure to about 20 atmospheres.

14. A process for the manufacturing, in a closed vessel, of methyl alcohol from methyl chlorid, said process consisting in charging the vessel with methyl chlorid, a soluble basic calcium compound and water; agitating the contents of the vessel whereby a film of the liquids therein is formed on the inner face of the vessel; and raising the temperature of the materials to above 100° C. and the pressure to about 20 atmospheres.

15. A process for the saponification of chlor derivatives of aliphatic hydrocarbons, said process consisting in inclosing a mixture of a chlor derivative of an aliphatic hydrocarbon and an alkaline solution within a reaction space; surrounding the reaction space with a film of said materials and raising the temperature and pressure in the vessel.

16. A process for the saponification of chlor derivatives of aliphatic hydrocarbons in a closed vessel, said process consisting in charging the vessel with an alkaline solution and a chlor derivative of an aliphatic hydrocarbon; coating the interior of the vessel with a film of the liquids therein; and raising the temperature and pressure in the vessel.

17. A process for the manufacture of methyl alcohol from methyl chlorid, said process consisting in inclosing a mixture of methyl chlorid and alkaline solution within a reaction space; surrounding said reaction space with a film of said materials and bringing about reactions between said materials to form methyl alcohol.

18. A process for the manufacture, in a closed vessel, of methyl alcohol from methyl chlorid, said process consisting in charging the vessel with methyl chlorid and an alkaline solution; coating the interior face of the vessel with a film of the liquids therein; and raising the temperature and pressure in the vessel.

In testimony whereof I have signed this specification in the presence of two subscribing witnesses.

BURRITT S. LACY.

Witnesses:
H. FOERSTERLING,
C. DILL.